UNITED STATES PATENT OFFICE.

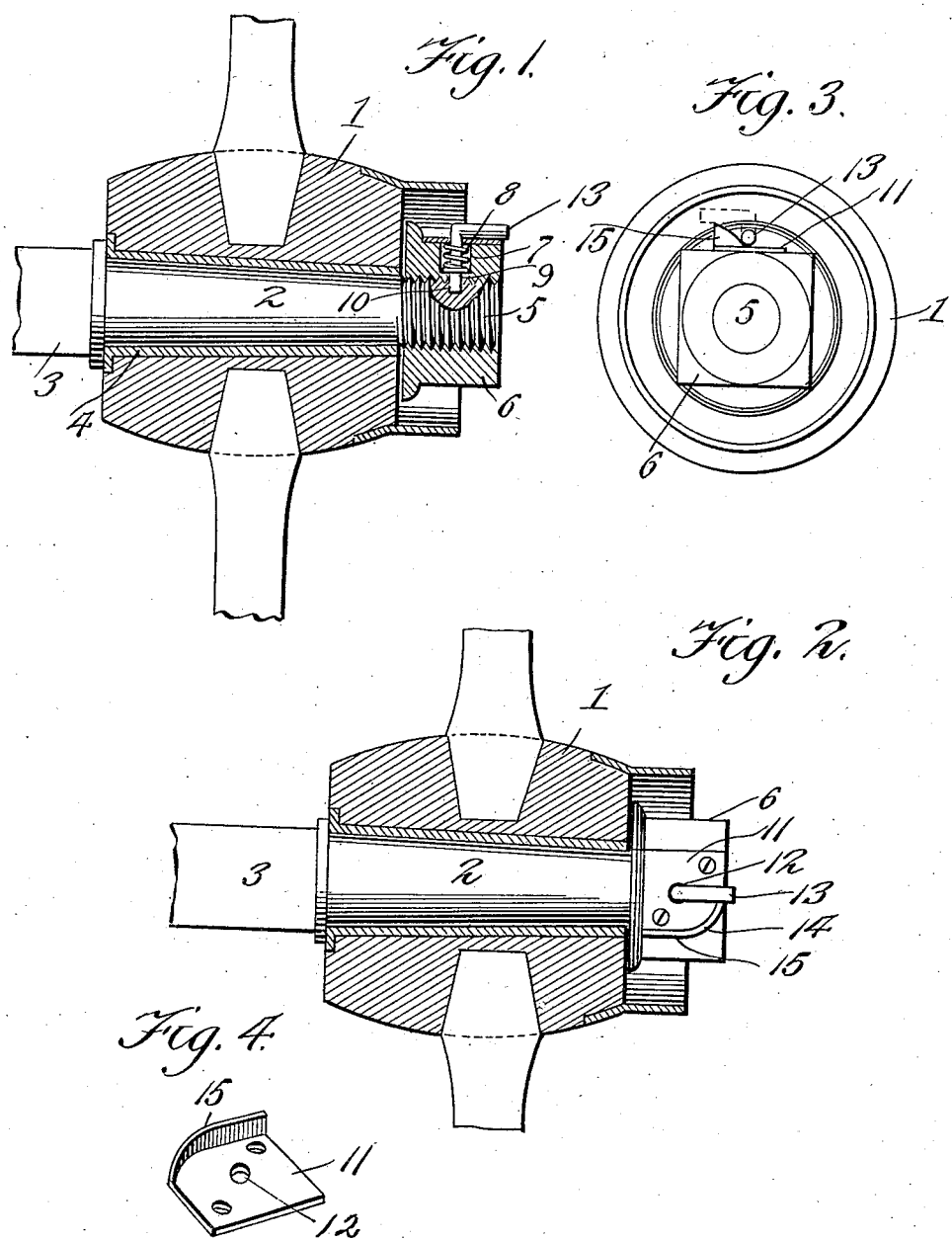

FRED R. SMITH, OF BRADDOCK, PENNSYLVANIA.

NUT-LOCK.

No. 876,741.　　　Specification of Letters Patent.　　　Patented Jan. 14, 1908.

Application filed June 11, 1907. Serial No. 378,432.

*To all whom it may concern:*

Be it known that I, FRED R. SMITH, a citizen of the United States, residing at Braddock, in the county of Allegheny and State of Pennsylvania, have invented new and useful Improvements in Nut-Locks, of which the following is a specification.

This invention relates to a nut lock for vehicles, whereby the nuts are prevented from working loose from the axle spindles or skeins when the vehicle is backed, and while the invention is particularly useful in this connection, it is to be understood that the principles thereof can be employed for other purposes.

The invention has for one of its objects to improve and simplify the construction and operation of devices of this character so as to be comparatively easy and inexpensive to manufacture, thoroughly reliable in use, and conveniently manipulated.

A further object of the invention is the provision of a spring-pressed pin arranged in the nut and which can be held outdrawn by means of a cam attached to the nuts, so that the latter can be applied to or removed from the skein, bolt or the like.

With these objects in view and others, as will appear as the description proceeds, the invention comprises the various novel features of construction and arrangement of parts which will be more fully described hereinafter and set forth with particularity in the claims appended hereto.

In the accompanying drawing, which illustrates one of the embodiments of the invention, Figure 1 is a central longitudinal section of the hub of a wheel showing it in position on a skein and the improved nut lock. Fig. 2 is a similar view taken at right angles to the skein of Fig. 1. Fig. 3 is an end view. Fig. 4 is a perspective view of the cam for holding the locking pin in unlocking position.

Similar reference characters are employed to designate similar parts throughout the several views.

Referring to the drawing, 1 designates the hub of a wheel mounted on the skein 2 of the axle 3, the hub having the usual sleeve or box 4 engaging the skein. The outer end of the skein is threaded at 5 in the usual manner and applied thereto is a nut 6 for holding the wheel rotatably in place.

The nut 6 has at one side a radially extending chamber 7 in which is a helical compression spring 8. This spring is connected with a locking pin 9 that projects through the chamber 7 and into the bore of the nut, and the inner end is adapted to engage in an opening or recess 10 in the threaded portion of the skein. The spring tends to move the pin inwardly or hold it in locking position, and on the nut is secured a plate 11 that has a central opening 12 through which the pin extends, and the upper end of the pin is bent laterally as at 13 to engage a cam 14 which is formed by bending upwardly the edge of the plate 11.

The operation may be briefly described as follows. Normally, the pin is in the position shown in Figs. 1 and 2 so as to lock the nut 6 on the skein, and it will be noted that the laterally projecting end or finger 13 of the pin occupies a position at one side of the cam 14, and the spring 8, therefore, holds the inner end of the pin in the opening or recess 10 of the skein. When it is desired to remove the nut, the finger 13 is turned through ninety degrees so as to ride over and on the cam 14, thereby moving the pin outwardly and disengaging it from the opening 10. The flat top portion 15 of the cam will hold the pin outdrawn so that the nut can be taken off in the usual manner. In replacing the nut, the pin will be moved to outdrawn position and so held by the cam that the nut can be screwed on without the pin interfering. When the nut is screwed home, the pin is released so that it can enter the opening 10. It will thus be seen that the nut cannot be worked loose under any condition.

From the foregoing description, taken in connection with the accompanying drawing, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative and that such changes may be made when desired, as are within the scope of the claims.

Having thus described the invention, what I claim is:

1. The combination of a nut having a radially extending opening, a right-angularly bent pin extending into the opening, means for urging the pin inwardly, a plate attached to the nut and having a cam over which the outer portion of the pin moves, and a threaded member engaged by the pin.

2. The combination of a nut having an opening at one side, a pin movable longitudinally therein, a laterally extending finger on the pin, a spring urging the pin inwardly, a plate removably secured to the nut, a cam formed on the plate to be engaged by the finger, and a threaded member having a depression into which the pin engages.

In testimony whereof, I affix my signature in presence of two witnesses.

FRED R. SMITH.

Witnesses:
C. A. STOKES,
E. H. HUTZEN.